US008296349B2

United States Patent
Hsu et al.

(10) Patent No.: US 8,296,349 B2
(45) Date of Patent: Oct. 23, 2012

(54) DISCRETE COSINE (DCT) AND INVERSE DISCRETE COSINE TRANSFORM CIRCUIT (IDCT) THAT EXECUTES DCT/IDCT OPERATIONS WITH BUFFERFLY STAGES

(75) Inventors: Ming-Chung Hsu, Taipei Hsien (TW); Yi-Shin Tung, Taipei Hsien (TW); Yi-Shin Li, Taipei Hsien (TW); Chia-Ying Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 579 days.

(21) Appl. No.: 12/613,658

(22) Filed: Nov. 6, 2009

(65) Prior Publication Data

US 2011/0035425 A1 Feb. 10, 2011

(30) Foreign Application Priority Data

Aug. 5, 2009 (CN) .......................... 2009 1 0305238

(51) Int. Cl.
*G06F 15/00* (2006.01)
(52) U.S. Cl. ...... 708/402; 708/400; 708/401; 375/240.2
(58) Field of Classification Search .......... 708/400–402; 375/240.2
See application file for complete search history.

(56) References Cited

U.S. PATENT DOCUMENTS

| | | | | |
|---|---|---|---|---|
| 5,594,679 A | * | 1/1997 | Iwata | 708/521 |
| 5,831,881 A | * | 11/1998 | Fiedrich et al. | 708/402 |
| 6,460,062 B1 | * | 10/2002 | Matsui | 708/402 |
| 6,574,648 B1 | * | 6/2003 | Oohashi et al. | 708/402 |
| 6,704,759 B2 | * | 3/2004 | Timko et al. | 708/402 |
| 6,996,595 B2 | * | 2/2006 | LaRocca et al. | 708/400 |
| 7,020,671 B1 | * | 3/2006 | Saha | 708/402 |
| 7,649,939 B2 | * | 1/2010 | LaRocca et al. | 375/240.02 |
| 2003/0078952 A1 | | 4/2003 | Kim et al. | |

* cited by examiner

*Primary Examiner* — Tammara Peyton
(74) *Attorney, Agent, or Firm* — Altis Law Group, Inc.

(57) ABSTRACT

A discrete cosine transform (DCT) and inverse discrete cosine transform (IDCT) circuit includes a microcode memory, a processor, and a butterfly operation circuit. The microcode memory stores multiple microcode groups corresponding to DCT/IDCT operations and each of the microcode groups includes a series of microcodes. The processor obtains one of the microcode groups corresponding to one of the DCT/IDCT operations to be performed and retrieves microcodes in the obtained microcode group in sequence. The butterfly operation circuit performs butterfly operations according to the retrieved microcodes to execute one of the DCT/IDCT operations.

11 Claims, 4 Drawing Sheets

DISCRETE COSINE (DCT) AND INVERSE DISCRETE COSINE TRANSFORM CIRCUIT (IDCT) THAT EXECUTES DCT/IDCT OPERATIONS WITH BUFFERFLY STAGES

BACKGROUND

1. Technical Field

Embodiments of the present disclosure relate to video encoding and decoding technology, and more particularly to a discrete cosine and inverse discrete cosine transform circuit.

2. Description of Related Art

Discrete cosine transform and inverse discrete cosine transform (DCT and IDCT) are respectively used in the encoding and decoding of video data, known as video codec. The video data generally comprise a series of images, each composed of a plurality of 8*8 pixel blocks. Encoding of the video data includes performing the DCT on each block to transform the pixel blocks to frequency domain data. Decoding of the video data includes performing the IDCT on the frequency domain data to transform the frequency domain data to pixel data. Generally, a DCT/IDCT operation with two dimensions (2-D) can be executed by performing transform operations on a row or a column with one dimension (1-D) and then on a column or a row with another dimension. The DCT/IDCT operation includes numerous butterfly operations.

A wide variety of video codec protocols, such as H.264, WMV9, and MPEG-2 are employed. Encoding or decoding according to these video codec protocols requires DCT/IDCT operations. However, operations related to each specific video codec protocol differ greatly from one another and must be respectively performed by different circuits. As a video device is required to support most or all of this variety of video codec protocols, a corresponding plurality of different circuits is required, such that the video device must be configured with large scale circuits, complicating design and elevating costs. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

Figure 1:
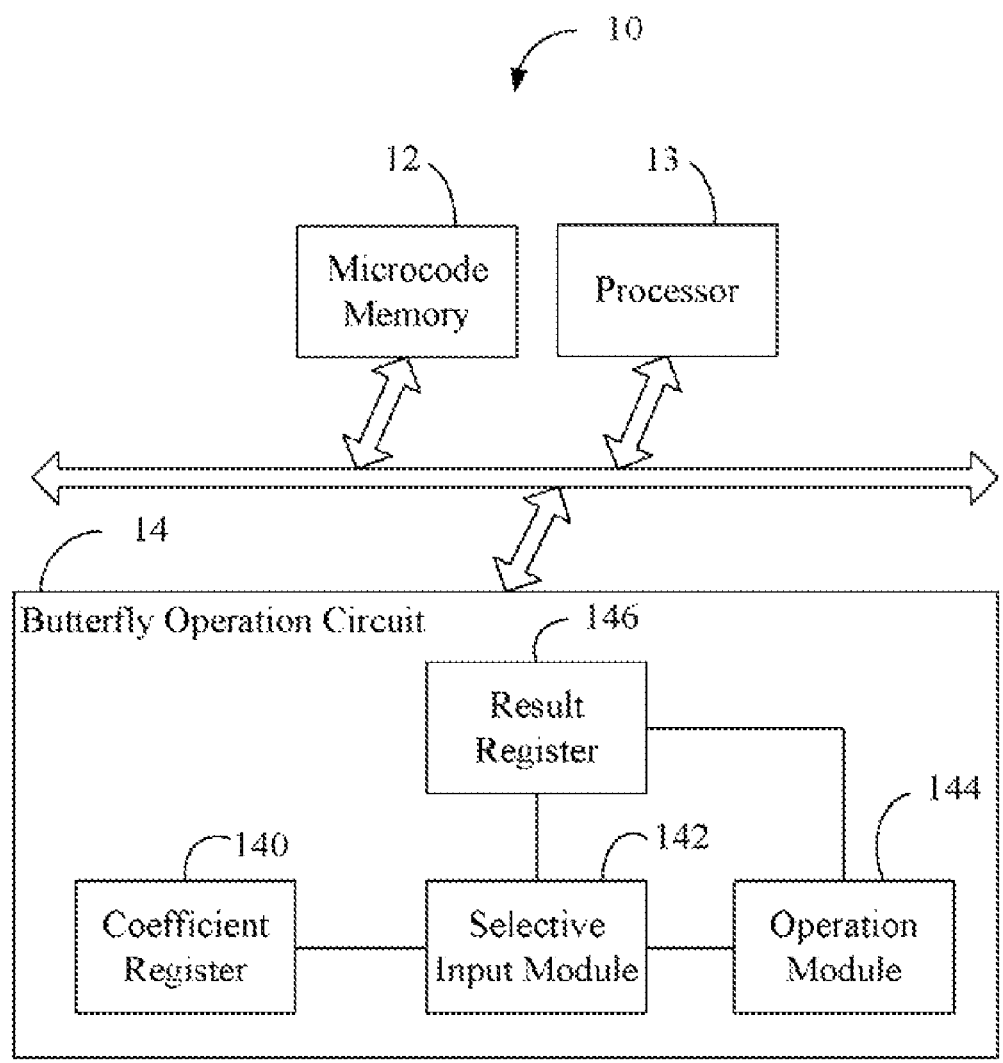
FIG. 1 is a schematic diagram of functional modules of one embodiment of a DCT and IDCT circuit of the present disclosure.

FIG. 1 is a schematic diagram of functional modules of one embodiment of a discrete cosine transform (DCT) and inverse discrete cosine transform (IDCT) circuit 10 of the present disclosure.

Figure 2:
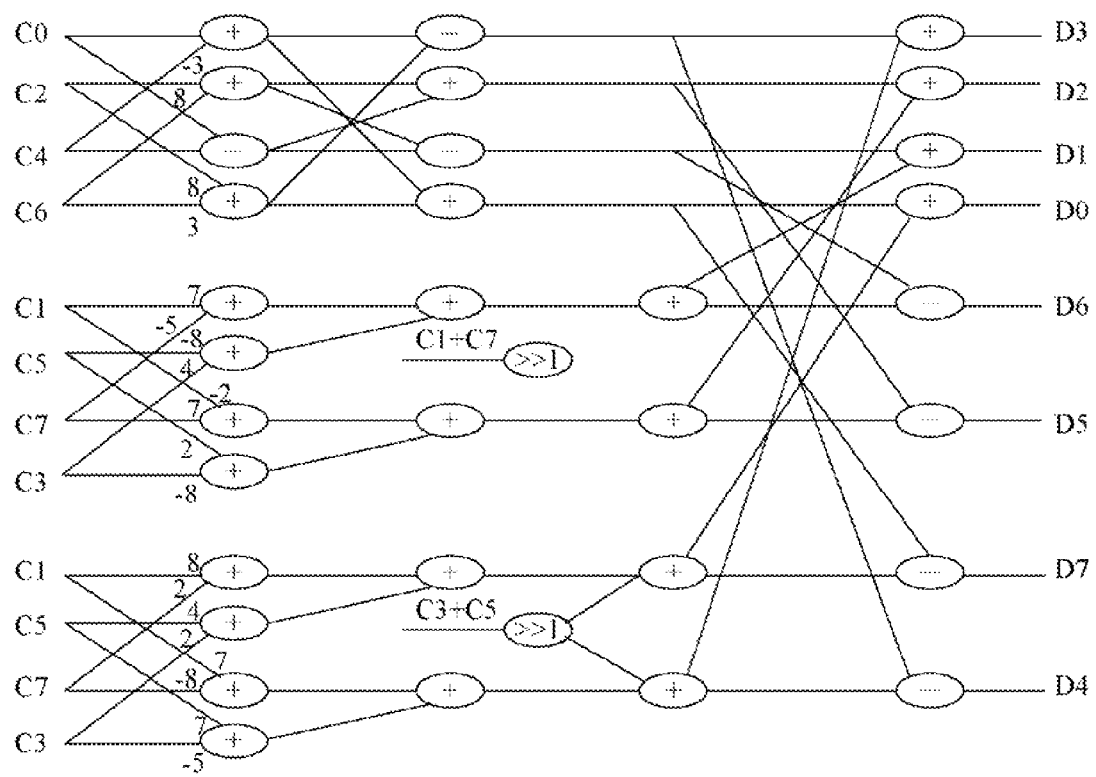
FIG. 2 is a schematic diagram of butterfly operations in a 8*8 IDCT according to WMV9.

Generally, DCT and IDCT operations of the video codec protocols can be transformed into butterfly operations defined by the video codec. Different video codec protocols relate to different butterfly operations. For example, FIG. 2 is a schematic diagram showing butterfly operations in an 8*8 IDCT according to WMV9 video codec. In FIG. 2, coefficients C0, C1 . . . C7 are employed by the IDCT, −3, 8, 3, −5 are constants of the IDCT, and D0, D1 . . . D7 are operation results of the IDCT. The coefficients vary with different pixel blocks. The constants of one of the DCT/IDCT operations are constant. As shown in FIG. 2, the 8*8 IDCT of WMV9 is transformed into a series of butterfly operations. Transformations of the IDCT of other video codec protocols can also be transformed into similar butterfly operations.

It should be noted that FIG. 2 is only an example. The DCT and IDCT circuit 10 are not limited to the butterfly operations of FIG. 2, but can also perform all of the DCT and IDCT, such as 2*2, 4*4. In addition, the DCT and IDCT circuit 10 can support a plurality of video codec protocols, such as H.264, MPEG-2.

Referring back to FIG. 1, in one embodiment, the DCT and IDCT circuit 10 includes a microcode memory 12, a processor 14, and a butterfly operation circuit 14.

The microcode memory 12 is configured and structured to store multiple microcode groups. Each microcode group includes a series of microcodes and each butterfly operation corresponds to at least one microcode. In one embodiment, each video codec protocol includes various DCT/IDCT operations, such as 2*2, 4*4, 8*8. The DCT/IDCT operations correspond to the multiple microcode groups stored in the microcode memory 12. The multiple microcode groups correspond to a plurality of the video codec protocols and the DCT/IDCT operations. Therefore, the DCT and IDCT circuit 10 can support the plurality of the video codec protocols. It should be understood that a microcode is a layer of hardware-level instructions and/or data structures involved in the implementation of higher level machine code instructions in hardware, such as processors. In one embodiment, the microcode groups are predetermined according to the video codec protocols and stored in the microcode memory 12.

The processor 13 is configured and structured to retrieve microcodes from the microcode memory 12 and control the butterfly operation circuit 14 to perform butterfly operations according to the retrieved microcodes to execute one of the DCT/IDCT operations for which it is intended. In one embodiment, the processor 13 obtains a microcode group relating to the one of the DCT/IDCT operations and then retrieves microcodes in the obtained microcode group in sequence.

The butterfly operation circuit 14 is configured and structured to perform the butterfly operations according to the microcodes retrieved by the processor 13. In one embodiment, the butterfly operation circuit 14 includes a coefficient register 140, a selective input module 142, an operation module 144, and a result register 146.

The coefficient register 140 is configured and structured to store coefficients employed by the butterfly operations. Further details of the coefficients will be explained below.

The result register 146 is configured and structured to store operation results of the butterfly operations.

The selective input module 142 is configured and structured to select one of the coefficients from the coefficient register 140 and the operation results from the result register 146 according to the microcodes retrieved by the processor 13, and output the selected result.

The operation module 144 is configured and structured to perform operations on the output of the selective input module 142 according to the retrieved microcodes to obtain the operation results and store the operation results to the result register 146. In detail, the processor 13 directs the selective input module 142 to output corresponding data to the operation module 144 according to time cycles.

Figure 3:
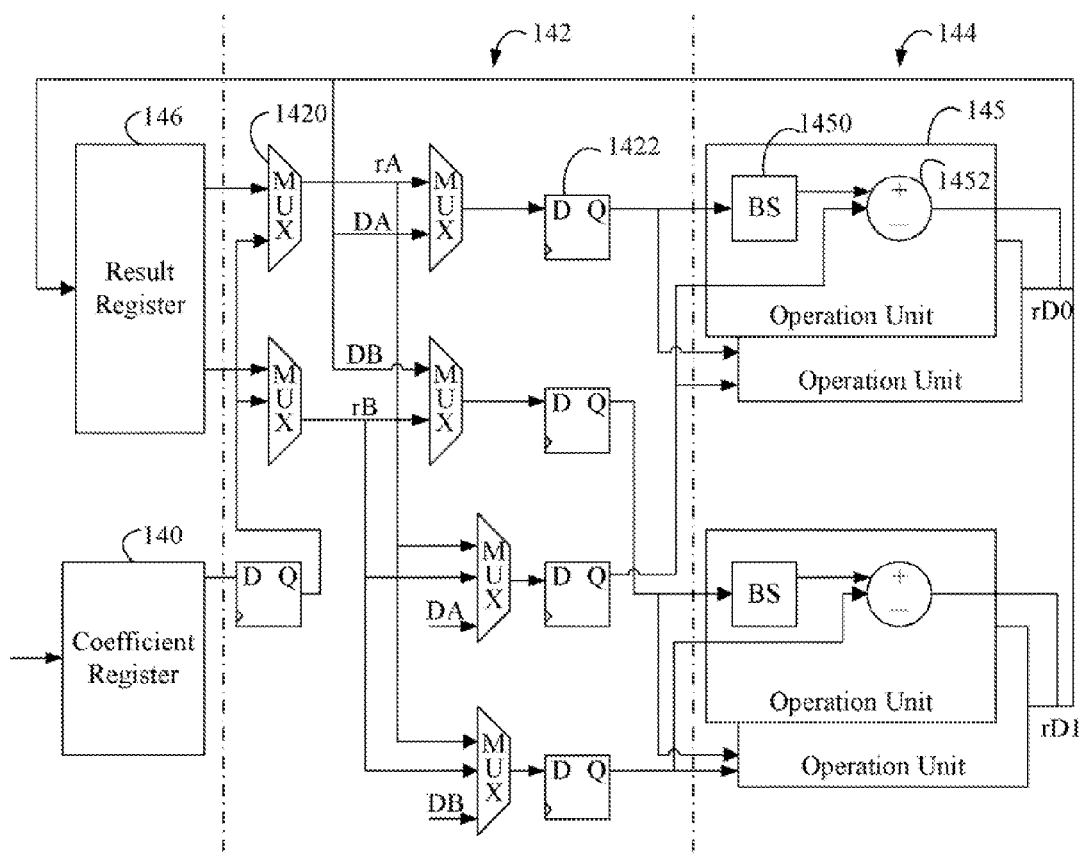
FIG. 3 is a schematic diagram of one embodiment of a butterfly operation circuit of FIG. 1.

FIG. 3 is a schematic diagram of one embodiment of a butterfly operation circuit 14 of FIG. 1. It is noted that, in the figures of the present disclosure, only one element is labeled if a plurality of the elements have the same name and the label indicates all of the elements, for simplicity and comprehension.

In one embodiment, the selective input module 142 includes a plurality of multiplexers 1420 (short for MUX in FIG. 3) and a plurality of D-Flip-Flops 1422.

The plurality of multiplexers 1420 are configured and structured to selectively output the coefficients in the coefficient register 140 and the operation results in the result register 146. In one embodiment, the plurality of the multiplexers 1420 is further configured and structured to selectively output the operation results of a previous operation before a subsequent operation is performed.

The plurality of D-Flip-Flops 1422 are configured and structured to direct time cycles of the selectively output of the multiplexers 1420 to synchronize the selected data output to the operation module 144. In one embodiment, the processor 13 directs the multiplexers 1420 to select and output corresponding data to the D-Flip-Flops 1422, and then directs the D-Flip-Flops 1422 to output the selected corresponding data to the operation module 144 according to the time cycles.

The operation module 144 includes at least two operation units 145. In one embodiment, each operation unit 145 includes a shifter 1450 and an adder-subtractor 1452.

The shifter 1450 is connected to the selective input module 142 and configured and structured to perform shift operations on the output of the selective input module 142. The shift operation indicates to shift left or right a number by a special shift digit. If the shifter 1450 shifts left a number in n (such as 0, 1, 2, 3 . . . ) digit, the number is multiplied by $2^n$, and if shifts right, the number is divided by $2^n$. For example, if the shifter 1450 shifts left the number in 1, the number is multiplied by 2. If the shifter 1450 shifts left the number in 2, the number is multiplied by 4. If the shifter 1450 shifts left the number in 3, the number is multiplied by 8.

A first input end of the adder-subtractor 1452 is connected to an output end of the shifter 1450. A second input end of the adder-subtractor 1452 is connected to the selective input module 142. The adder-subtractor 1452 is configured and structured to perform addition or subtraction operations on the output of the shifter 1450 and the selective input module 142 and store the operation result of the addition or subtraction operations to the result register 146.

Figure 4:
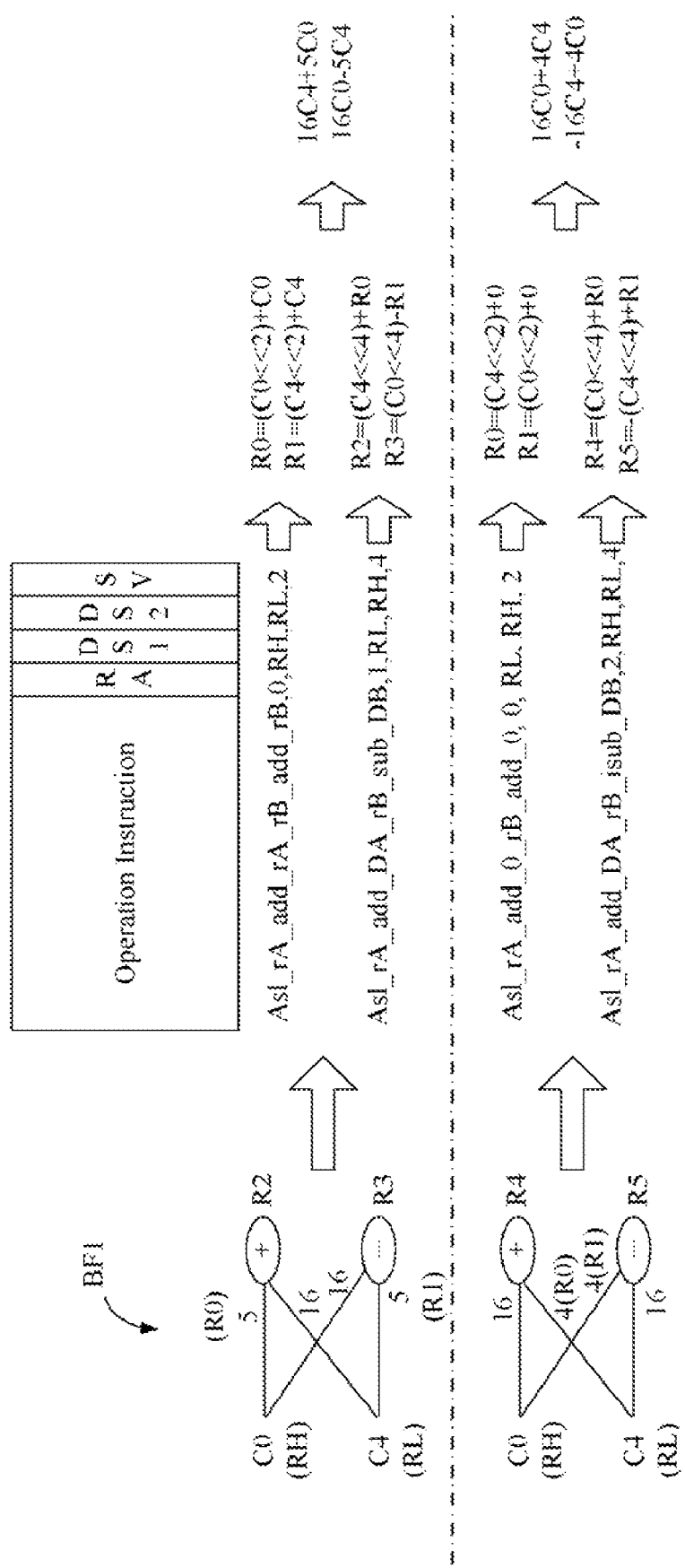
FIG. 4 is a schematic diagram showing generation of microcodes according to a butterfly operation and performance of the butterfly operation according to the circuit of FIG. 1.

FIG. 4 is a schematic diagram showing generation of microcodes according to a butterfly operation and performance of the butterfly operation according to the circuit of FIG. 1. In one embodiment, each microcode includes an operation instruction, a result address (short for RA in FIG. 4), a plurality of data sources (short for DS in FIG. 4), and a shift value (short for SV in FIG. 4).

The result address indicates storing address of the operation results output by the adder-subtractor 1452 in the result register 146. In one embodiment, the result address is predetermined. The adder-subtractor 1452 stores the operation results according to the predetermined result address. For example, if the operation result is predetermined to be stored in a first register, the result address can be predetermined as r1. If the operation result is predetermined to be stored in a second register, the result address can be predetermined as r2.

The plurality of data sources indicate the selective input module 142 to select the operation data output to the operation module 144. In one embodiment, the operation data includes two kinds of data, operation coefficients employed by the DCT/IDCT operations, and operation results stored in the result register 146. For example, if the operation module 144 requires an operation coefficient of the DCT/IDCT operations, the related data source may be set as an output end of a related D flip-flop 1422 and the D flip-flop 1422 outputs the operation coefficient in a required time cycle. If the operation module 144 requires an operation result, the related data source may be set as a related result address, such as the first register.

The shift value indicates a shift digit of a shift operation of the operation data from the selective input module 142 performed by the shifter 1450.

The operation instruction indicates operation data employed by the operation module 144 and formulae for operating the operation data. The operation instruction includes a shift direction, the operation data of the operation module 144, and a plurality of operation formulae. The operation module 144 performs shift operations on the operation data according to the shift digit and the shift direction to obtain shift results, and then performs operations on the operation data and the shift results according to the operation formulae to obtain the operation results.

For example, the operation instruction may include a shift direction, a first operation number, a second operation number, a third operation number, a fourth operation number, a first operation formula, and a second operation formula. As such, the operation module 144 performs a shift operation on the first operation number according to the shift direction and the shift value, and performs an operation on a result of the shift operation and the second operation number according to the first operation formula. Then, the operation module 144 performs a shift operation on the third operation number according to the shift direction and the shift value, and performs an operation on a result of the shift operation and the fourth operation number according to the second operation formula.

The operation formulae include all operations performed by the operation module, such as addition, subtraction, and addition after reversing.

The operation data of the operation module 144 includes the operation data indicated by the plurality of data sources. In one embodiment, the operation data of the operation module 144 further includes the operation results of a previous operation before a subsequent operation is performed.

Referring FIG. 4, a first butterfly BF1 requires operations expressed as "R2=5C0+16C4" and "R3=16C0-5C4". "C0" and "C4" are the coefficients employed by the DCT/IDCT operations. 5 and 6 are the constants of the DCT/IDCT operations. "R2" and "R3" are the operation results of the first butterfly operation BF1. The microcode related to the first butterfly operation BF1 can be predetermined as "As1_rA_add_rA_rB_add_rB, rD0, RH, RL, 2" and "As1_rA_add_DA_rB_subvDB, rD1, RL, RH, 4". "As1_rA_add_rA_rB_add_rB" and "As1_rA_add_DA_rB_sub_DB" are two operation instructions.

In the example, "rD0" and "rD1" are two result addresses. "RH" and "RL" are two data sources. 2 and 4 are two shifter values. In the operation instruction, "As1" indicates the shifter 1450 to shift left a received number, namely performing a multiplication operation on the received number. "rA" and "rB" indicate the operation data obtained from the data sources. "DA" and "DB" indicate the operation result of a prior time cycle.

Additionally, "rA_add_rA" indicates shifting left "rA" with 2 digits and adding a result of the shifting to "rA". "rB_add_rB" indicates shifting left "rB" with 2 digits and adding a result of the shifting to "rB". As such, the result operations are expressed as "R0=(C0<<2)+C0=5C0" and "R1=(C4<<2)+C4=5C4". "rA_add_DA" indicates shifting left "rA" with 4 digits and adding a result of the shifting to "DA". "rB_sub_DB" indicates shifting left "rB" with 4 digits and subtracting "DB" from a result of the shifting. "DA" and "DB" indicate the operation result of a prior time cycle, here namely R0 and R1. As such, the operation results are expressed as "R2=(C4<<4)+5C0=16C4+5C0" and "R3=(C0<<4)−5C4=16C0−5C4".

Furthermore, a second butterfly BF2 is predetermined similar to BF1. "rB_isub_DB" indicates shifting left "rB", then reversing a result of the shifting, and then adding a result of the reversal to DB. As such, the operation results are expressed as "R4=(C0<<4)+R0=16C0+4C4" and "R5=−(C4<<4)+R1=−16C4+4C0".

In one embodiment, a butterfly operation relates at least one microcode. If the operation module 144 includes two operation units 145, one time cycle is required to perform each microcode. If a higher operation rate is required, only more operation units are required. In the illustrated example in FIG. 3, four operation units in the operation module 144 require one time cycle to perform two microcodes, which significantly increases operation rate of the DCT and IDCT circuit 10 as disclosed. In addition, the operation unit 145 using the shifter 1450 presents significantly lower costs than using a complex multiplier to perform a multiplication, while additionally simplifying structure of the DCT and IDCT circuit 10 as disclosed.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A discrete cosine transform (DCT) and inverse discrete cosine transform (IDCT) circuit configured and structured to perform DCT/IDCT operations, wherein each of the DCT/IDCT operations comprises a series of butterfly operations each employing multiple coefficients, the DCT and IDCT circuit comprising:
   a microcode memory configured and structured to store multiple microcode groups corresponding to the DCT/IDCT operations, wherein each of the microcode groups comprises a series of microcodes;
   a processor configured and structured to obtain one of the microcode groups corresponding to one of the DCT/IDCT operations, and retrieve microcodes in the obtained one of the microcode groups in sequence;
   a butterfly operation circuit configured and structured to perform butterfly operations according to the retrieved microcodes to execute one of the DCT/IDCT operations, wherein the butterfly operation circuit comprises:
      a coefficient register configured and structured to store coefficients employed by the butterfly operations;
      a result register configured and structured to store operation results of the butterfly operations;
      a selective input module configured and structured to select one from the coefficients in the coefficient register and the operation results in the result register according to the microcodes retrieved by the processor, and output the select result; and
      an operation module configured and structured to perform operations on the output of the selective input module according to the retrieved microcodes to obtain the operation results and store the operation results to the result register.

2. The DCT and IDCT circuit as claimed in claim 1, wherein each microcode comprises:
   an operation instruction indicating operation data employed by the operation module and formulae for operating the operation data;
   a result address indicating storing address of the operation results in the result register;
   a plurality of data sources indicating the selective input module to select the operation data output to the operation module; and
   a shift value indicating a shift digit of a shift operation on the operation data from the selective input module performed by the operation module.

3. The DCT and IDCT circuit as claimed in claim 2, wherein the operation instruction comprises:
   a shift direction indicating a shift direction of the shift operation of the operation data from the selective input module performed by the operation module;
   the operation data of the operation module; and
   a plurality of operation formulae indicating the operation module to perform operations on the operation data.

4. The DCT and IDCT circuit as claimed in claim 3, wherein the plurality of operation formulae comprises addition, subtraction, and addition after reversing.

5. The DCT and IDCT circuit as claimed in claim 3, wherein the operation data of the operation module comprises the operation data indicated by the plurality of data sources.

6. The DCT and IDCT circuit as claimed in claim 5, wherein the operation data of the operation module further comprises previous operation results before a subsequent operation is performed.

7. The DCT and IDCT circuit as claimed in claim 3, wherein the operation module is further configured and structured to perform shift operations on the operation data according to the shift digit and the shift direction to obtain shift results.

8. The DCT and IDCT circuit as claimed in claim 7, wherein the operation module is further configured and structured to perform operations on the operation data and the shift results according to the operation formulae to obtain the operation results.

9. The DCT and IDCT circuit as claimed in claim 1, wherein the operation module comprises at least two operation units, each of the at least two operation units comprising:
   a shifter connected to the selective input module and configured and structured to perform the shift operation on the output of the selective input module; and
   an adder-subtractor comprising a first input end connected to the shifter and a second input end connected to the selective input module, and configured and structured to perform addition or subtraction on the output from the shifter and the selective input module to obtain the operation result.

10. The DCT and IDCT circuit as claimed in claim 1, wherein the selective input module comprises:
   a plurality of multiplexers configured and structured to selectively output the coefficients in the coefficient register and the operation results in the result register; and
   a plurality of D-Flip-Flops configured and structured to direct time cycles of the selective output of the multiplexers to synchronize the selected data output to the operation module.

11. The DCT and IDCT circuit as claimed in claim 10, wherein the plurality of the multiplexers is further configured and structured to selectively output the operation results of a previous operation before a subsequent operation is performed.

* * * * *